(12) United States Patent
Kim et al.

(10) Patent No.: US 8,825,207 B2
(45) Date of Patent: Sep. 2, 2014

(54) TRAJECTORY PLANNING METHOD, TRAJECTORY PLANNING SYSTEM AND TRAJECTORY PLANNING AND CONTROL SYSTEM

(75) Inventors: Chyon Hae Kim, Wako (JP); Shigeki Sugano, Tokyo (JP); Shota Yamazaki, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 176 days.

(21) Appl. No.: 13/455,436

(22) Filed: Apr. 25, 2012

(65) Prior Publication Data

US 2012/0277907 A1 Nov. 1, 2012

(30) Foreign Application Priority Data

Apr. 28, 2011 (JP) ................................. 2011-100919

(51) Int. Cl.
*G06F 19/00* (2011.01)
*B25J 9/16* (2006.01)
(52) U.S. Cl.
CPC ..... *B25J 9/1664* (2013.01); *G05B 2219/40465* (2013.01); *G05B 2219/40448* (2013.01)
USPC ........................................................ 700/245
(58) Field of Classification Search
USPC ........................................................ 700/245
See application file for complete search history.

(56) References Cited

U.S. PATENT DOCUMENTS

| | | | | |
|---|---|---|---|---|
| 4,829,219 A | * | 5/1989 | Penkar | 318/568.18 |
| 5,808,887 A | * | 9/1998 | Dorst et al. | 345/474 |
| 5,835,684 A | * | 11/1998 | Bourne et al. | 700/255 |
| 5,889,926 A | * | 3/1999 | Bourne et al. | 700/255 |
| 6,493,607 B1 | * | 12/2002 | Bourne et al. | 700/255 |
| 6,697,707 B2 | * | 2/2004 | Peters, II | 700/245 |

(Continued)

FOREIGN PATENT DOCUMENTS

| | | |
|---|---|---|
| JP | 2006-031523 A | 2/2006 |
| JP | 2008-152600 A | 7/2008 |

(Continued)

OTHER PUBLICATIONS

Steven M. LaValle et al., "Randomized Kinodynamic Planning", The International Journal of Robotics Research 2001, vol. 20, No. 5, http://ijr.sagepub.com/content/20/5/378, May 1, 2001, pp. 378-400.

(Continued)

*Primary Examiner* — Khoi Tran
*Assistant Examiner* — Harry Oh
(74) *Attorney, Agent, or Firm* — Squire Patton Boggs (US) LLP

(57) ABSTRACT

A trajectory planning method according to the present invention is one for obtaining a trajectory for controlling a state of an object toward a goal state by a trajectory planning system. The method includes the steps of dividing, by a cell generating section for dividing a state space of the object into cells, the state space into cells in such a way that approximation error due to discretization is minimized for a predetermined number of cells; generating, by a search tree generating section, a search tree which corresponds to state transition of the object in such a way that each cell does not contain more than one of nodes of branches of the search tree; and determining, by a trajectory generating section, a path from the current state to the goal state of the object using the search tree.

5 Claims, 15 Drawing Sheets

(56) References Cited

U.S. PATENT DOCUMENTS

| | | | |
|---|---|---|---|
| 8,116,908 B2* | 2/2012 | Ng-Thow-Hing et al. | 700/245 |
| 8,185,265 B2* | 5/2012 | Nagano | 701/25 |
| 8,458,715 B1* | 6/2013 | Khosla et al. | 718/104 |
| 2005/0149227 A1* | 7/2005 | Peters, II | 700/245 |
| 2008/0250875 A1* | 10/2008 | Khosla et al. | 73/863 |
| 2011/0172818 A1* | 7/2011 | Kim et al. | 700/246 |
| 2011/0231016 A1* | 9/2011 | Goulding | 700/246 |

FOREIGN PATENT DOCUMENTS

| | | |
|---|---|---|
| JP | 2009-211571 A | 9/2009 |
| JP | 2009-301455 A | 12/2009 |
| JP | 2010-155328 A | 7/2010 |
| WO | WO 2007/111252 A1 | 10/2007 |

OTHER PUBLICATIONS

Yuichi Tazaki et al., "Approximately Bisimilar Discrete Abstractions of Nonlinear Systems Using Variable-Resolution Quantizers," 2010 American Control Conference, WdB07.3, Jun. 30-Jul. 2, 2010, pp. 1015-1020.

Chyon Hae Kim et al., "Rapid Short-Time Path Planning for Phase Space," Journal of Robotics and Mechatronics, vol. 23, No. 2, Feb. 7, 2011, pp. 271-280.

* cited by examiner

TRAJECTORY PLANNING METHOD, TRAJECTORY PLANNING SYSTEM AND TRAJECTORY PLANNING AND CONTROL SYSTEM

BACKGROUND OF THE INVENTION

1. Field of the Invention

The present invention relates to a trajectory planning method, a trajectory planning system and a trajectory planning and control system in which a sequence of states of an object up to the goal state is generated.

2. Background Art

For example, assume that goal states of arms of a robot are realized by controlling torques around joints of the arms based on a trajectory planning. When positions and angles alone of the arms are handled in the trajectory planning, torques around the joints cannot be controlled. In order to control torques around the joints, a trajectory planning of a state space (phase space) which includes angles and angular velocities of the arms has to be generated.

As a method for handling state transitions in the phase space, there is a method using Rapidly-Exploring Random Tree (RET) (S. M. LaValle and J. J. Kuffner: "Randomized Kinodynamic Planning," Journal of Robotics Research, Vol. 20, No. 5, pp. 378-400, (2001)). However, since RRT is a stochastic method, minimum-cost motion cannot necessarily be realized. Further, there is a method which has been proposed by Tazaki and in which quantization of the state space is utilized (Y. Tazaki and J. Imura: "Approximately Bisimilar Discrete Abstractions of Nonlinear Systems Using Variable-resolution Quantizers," American Control Conference, pp. 1015-1020, (2010)). However, this method does not handle transitions in a continuous manner and the assumption of high linearity is required. Accordingly, applications of the method are limited to certain types of machines alone.

Under the situation, a motion planning method which uses division of the phase space and merging of branches of the search tree and by which quasi-minimum-cost motion can be planned through continuous search has been proposed by some of the inventors (C. H. Kim, H. Tsujino and S. Sugano: "Rapid Short-Time Path Planning for Phase Space," Journal of Robotics and Mechatronics, Vol. 23, No. 2, (2011)). By the method, quasi-minimum-cost motion from a given initial state to a set of goal states under constraints can be planned in a short time period through continuous search. However, in this method, the phase space is divided uniformly along each axis and a size of cell is determined individually by the designer. Further, an effective method of division by which motion costs are minimized has not been realized.

Thus, a trajectory planning method, a trajectory planning system and a trajectory planning and control system by which the state space can be divided such that motion costs are minimized and quasi-minimum-cost motion can be planned with a higher accuracy have not been developed.

Accordingly, there is a need for a trajectory planning method, a trajectory planning system and a trajectory planning and control system by which the state space can be divided such that motion costs are minimized and quasi-minimum-cost motion can be planned with a higher accuracy.

SUMMARY OF THE INVENTION

A trajectory planning method according to the first aspect of the present invention is a trajectory planning method for obtaining a trajectory for controlling a state of an object toward a goal state by a trajectory planning system. The method includes the steps of dividing, by a cell generating section for dividing a state space of the object into cells, the state space into cells in such a way that approximation error due to discretization is minimized for a predetermined number of cells; generating, by a search tree generating section, a search tree which corresponds to state transition of the object in such a way that each cell does not contain more than one of nodes of branches of the search tree, the nodes corresponding to states of the object; and determining, by a trajectory generating section, a path from the current state to the goal state of the object using the search tree.

In trajectory planning method according to the first aspect of the present invention, the state space is divided into cells in such a way that approximation error due to discretization is minimized for a predetermined number of cells. Accordingly, cost of motion is minimized and a quasi-minimum-cost trajectory can be planned with a higher accuracy.

In a trajectory planning method according to an embodiment of the present invention, in the step of dividing the phase space into cells, an approximation error of a cell is represented as an average of a distance between a state to which any point in the cell transfers when an input is given and a state to which the center of the cell transfers when the input is given and the approximation error due to discretization is minimized by minimizing a sum of approximation errors of the cells in the phase space.

According to the present embodiment, the approximation error due to discretization can be minimized with facility.

In a trajectory planning method according to another embodiment of the present invention, the step of dividing the phase space into cells includes a step of dividing the phase space into uniform basic cells, a step of dividing all the basic cells in such a direction as minimizes the approximation error of the cell, and a step of dividing and merging cells repeatedly to reduce a sum of approximation errors of the cells.

According to the present embodiment, the basic cells are divided in such a way that the approximation error of each basic cell is minimized and then cells are repeatedly divided and merged in order to globally reduce averaged approximation error of cells. Accordingly, the approximation error due to discretization can be minimized effectively.

A trajectory planning system according to the second aspect of the present invention is a trajectory planning system for obtaining a trajectory for controlling a state of an object toward a goal state. The trajectory planning system includes a cell generating section for dividing a state space of the object into cells in such a way that approximation error due to discretization is minimized; a search tree generating section for generating a search tree which corresponds to state transition of the object in such a way that each cell does not contain more than one of nodes of branches of the search tree, the nodes corresponding to states of the object; and a trajectory generating section for determining a path from the current state to the goal state of the object using the search tree.

In the trajectory planning system according to the second aspect of the present invention, the state space is divided into cells in such a way that approximation error due to discretization is minimized for a predetermined number of cells. Accordingly, cost of motion is minimized and a quasi-minimum-cost trajectory can be planned with a higher accuracy.

A trajectory planning and control system according to the third aspect of the present invention includes the trajectory planning system according to the second aspect of the present invention and a trajectory control section for realizing a trajectory determined by the trajectory planning system.

According to the trajectory planning and control system according to the third aspect of the present invention, a quasiminimum-cost trajectory which is planned with a high accuracy by the trajectory planning system according to the second aspect of the present invention can be realized.

Figure 14:
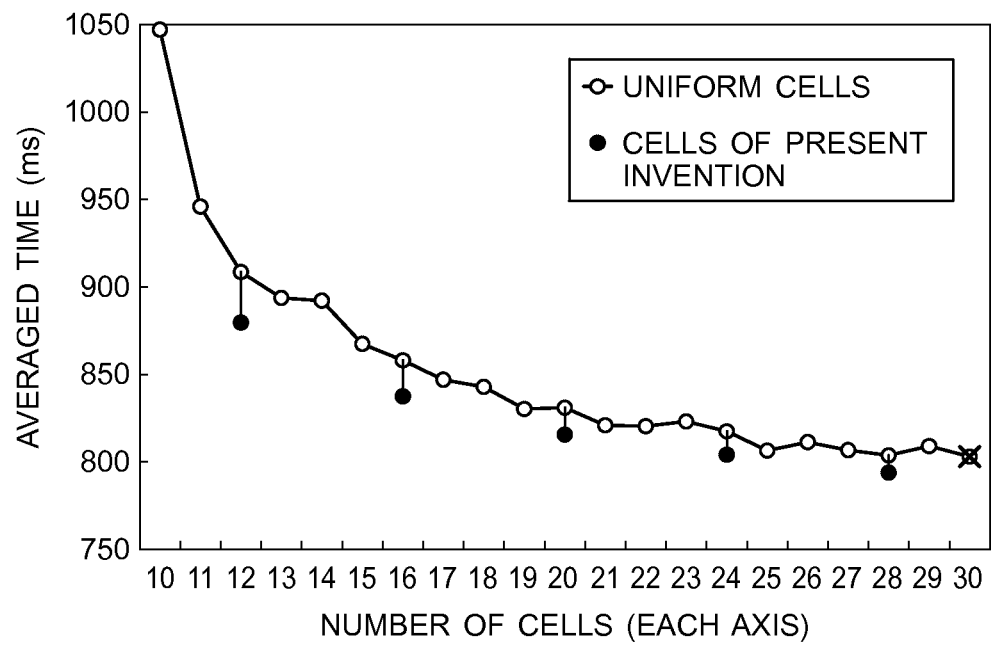
Figure 15A:
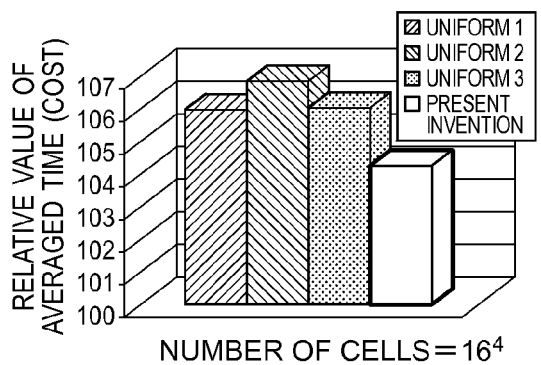
Figure 15B:
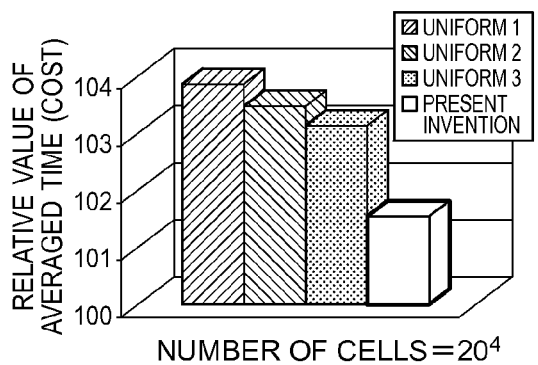
Figure 15C:
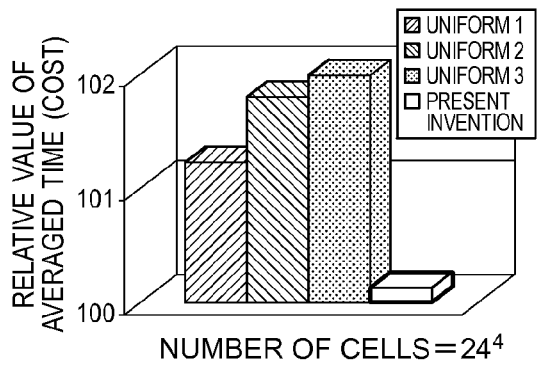
Figure 15D:
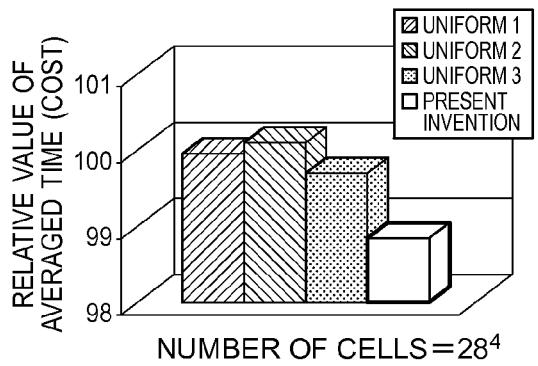

when the number of states (the final number of cells) is set to $20^4$;

FIG. 14 shows a relationship between the number of cells and averaged time of motion obtained through simulation; and FIG. 15A to FIG. 15D show results of cases in which division has been carried out with uniform length of cells set in each axial direction in three different ways and a case in which length of cells is uniformly fixed in the attitude space and cells are non-uniformly divided in the velocity directions alone in the manner described above, FIG. 15A to FIG. 15D respectively showing the results of cases with the number of states (the final number of cells) of $16^4$, $20^4$, $24^4$ and $28^4$.

DETAILED DESCRIPTION

Figure 1:
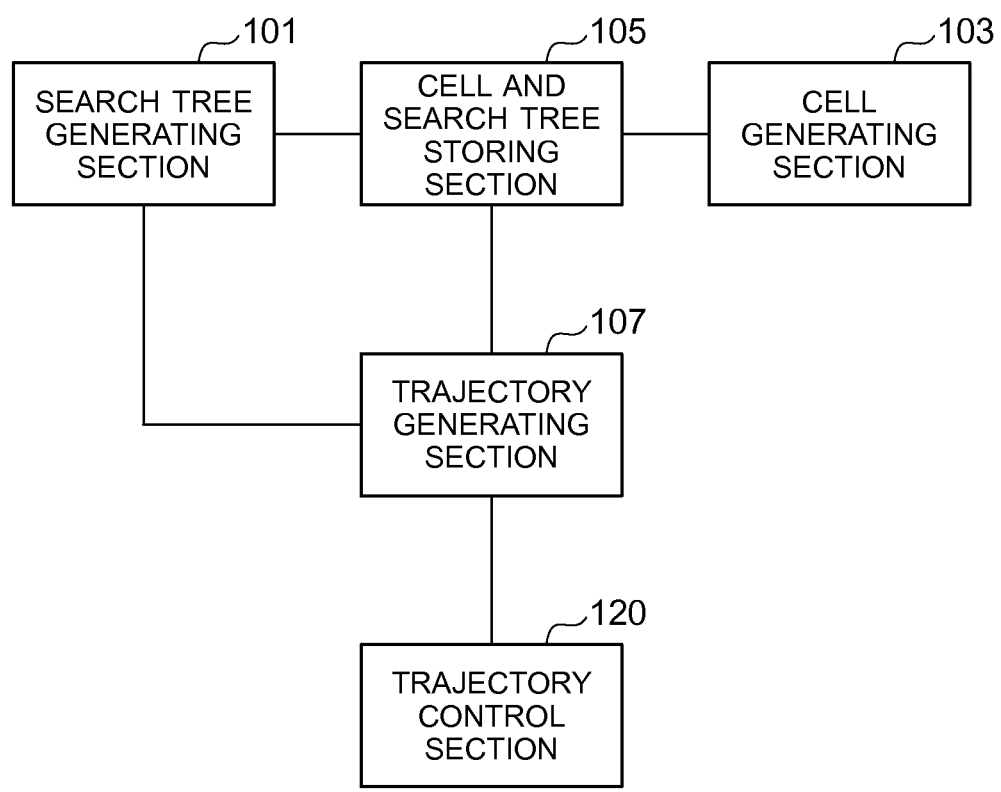
FIG. 1 shows a configuration of a trajectory planning and controlling system awarding to an embodiment of the present invention.

FIG. 1 shows a configuration of a trajectory planning system 100 according to an embodiment of the present invention. The trajectory planning system 100 is a system used to obtain a trajectory in a state space which leads to a goal state of such an object as an arm of a robot. The trajectory planning system 100 is provided with a search tree generating section 101 for generating a search tree having branches which correspond to positions of the object in the state space, that is, states, a cell generating section 103 for generating a plurality of cells by dividing the state space, a cell and search tree storing section 105 for storing cells and trees, and a trajectory generating section 107 for generating a trajectory of the object in the state space. Further, if a trajectory control section 120 for controlling motion of the object according to the generated trajectory is added to the system, a trajectory planning and control system can be obtained. Function of each component will be described in detail below.

Figure 2:
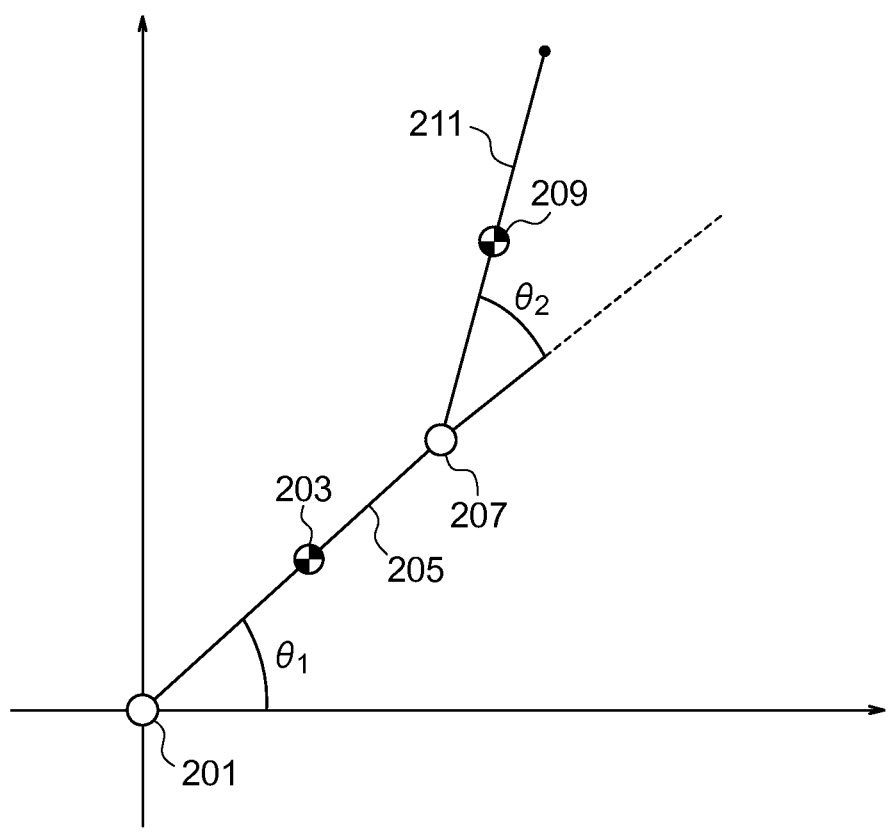
FIG. 2 shows a configuration of double inverted pendulums.

FIG. 2 shows a configuration of double inverted pendulums 200. In embodiments described below, the object is represented as double inverted pendulums 200 which move in a two-dimensional plane. The double inverted pendulums 200 include a first link 205 with a center of gravity 203, a second link 211 with a center of gravity 209, a first joint 201 which rotatably connects the first link 205 to a fixed point and a second joint 207 which rotatably connects the second link 211 to the first link 205.

Motion of the double inverted pendulums 200 is determined by torques imposed on the first joint 205 and the second joint 207 and is represented by an angle of the first link 205 with respect to x axis $\theta_1$, an angle of the second link 211 with respect the first link 205 $\theta_2$ and angular velocities of them $\dot{\theta}_1$ and $\dot{\theta}_2$. Under the circumstances, a phase space as described below is adopted as the state space.

$$(\theta_1, \theta_2, \dot{\theta}_1, \dot{\theta}_2)$$

Figure 3:
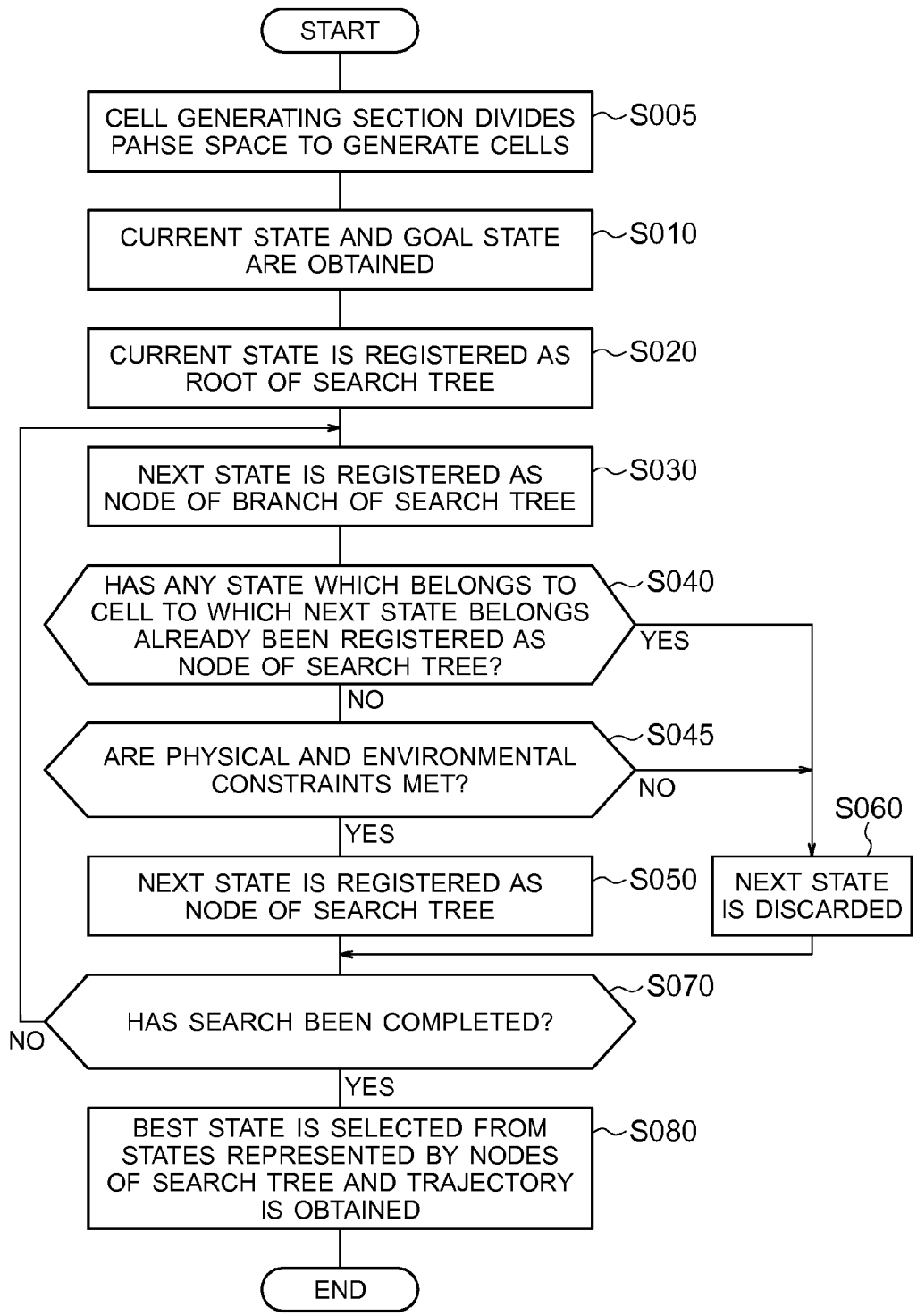
FIG. 3 is a flowchart for illustrating a trajectory planning method according to the present embodiment.

FIG. 3 is a flowchart for illustrating a trajectory planning method according to the present embodiment.

In step S005 in FIG. 3, the cell generating section 103 divides the phase space to generate a plurality of cells in advance. Operation of the cell generating section 103 will be described in detail later.

Figure 4:
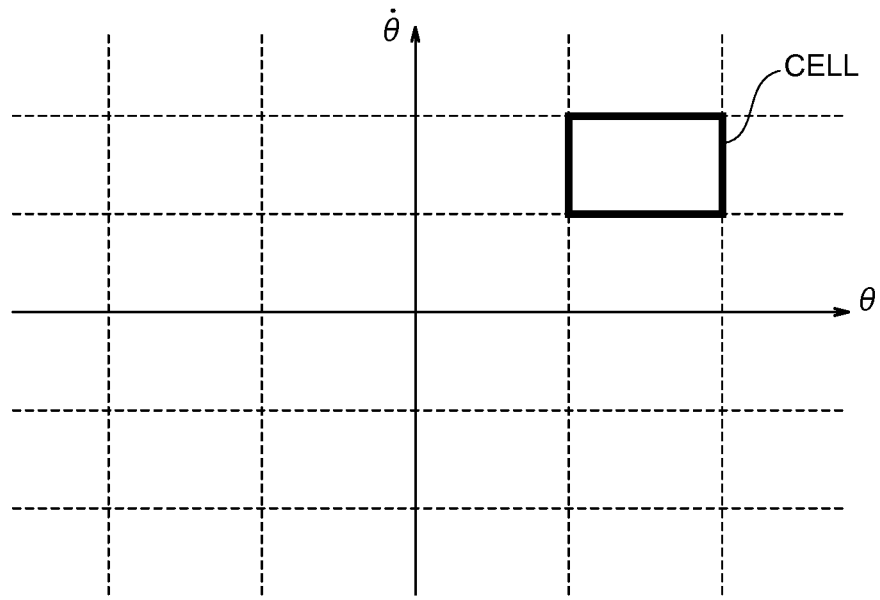
FIG. 4 shows an example of the divided phase space.

FIG. 4 shows an example of the divided phase space. In FIG. 4 the phase space is represented as a two-dimensional space for the sake of simplicity. Further, in FIG. 4, cells which have been generated by dividing an estimated range of angle and that of angular velocity into equal-length sections are shown in order to simplify the drawing. How to divide the phase space will be described in detail later.

In step S010 in FIG. 3, the search tree generating section 101 obtains the current state and the goal state of the double inverted pendulums 200. States correspond to positions in the phase space.

In step S020 in FIG. 3, the search tree generating section 101 registers the current state as the root of the search tree in the phase space.

In step S030 in FIG. 3, the search tree generating section 101 registers positions of next possible states after a predetermined time period as nodes of branches of the search tree. The next possible states after a predetermined time period are determined by equations of motion or a dynamics simulator. As described above, motion of the double inverted pendulums 200 is determined by torques imposed on the first joint 205 and the second joint 207. Accordingly, if torques to be imposed on the first joint 205 and the second joint 207 during a predetermined time period are determined, the next state of the double inverted pendulums 200 after the predetermined time period is determined. Torques to be imposed on the first joint 205 and the second joint 207 during the predetermined time period may be changed in increments of a predetermined amount between the minimum value and the maximum value and then states corresponding to respective cases may be determined. In this case, a complete search can be carried out by breadth first search while torques to be imposed on the first joint 205 and the second joint 207 during the predetermined time period are changed in increments of the predetermined amount between the minimum value and the maximum value.

Figure 5:
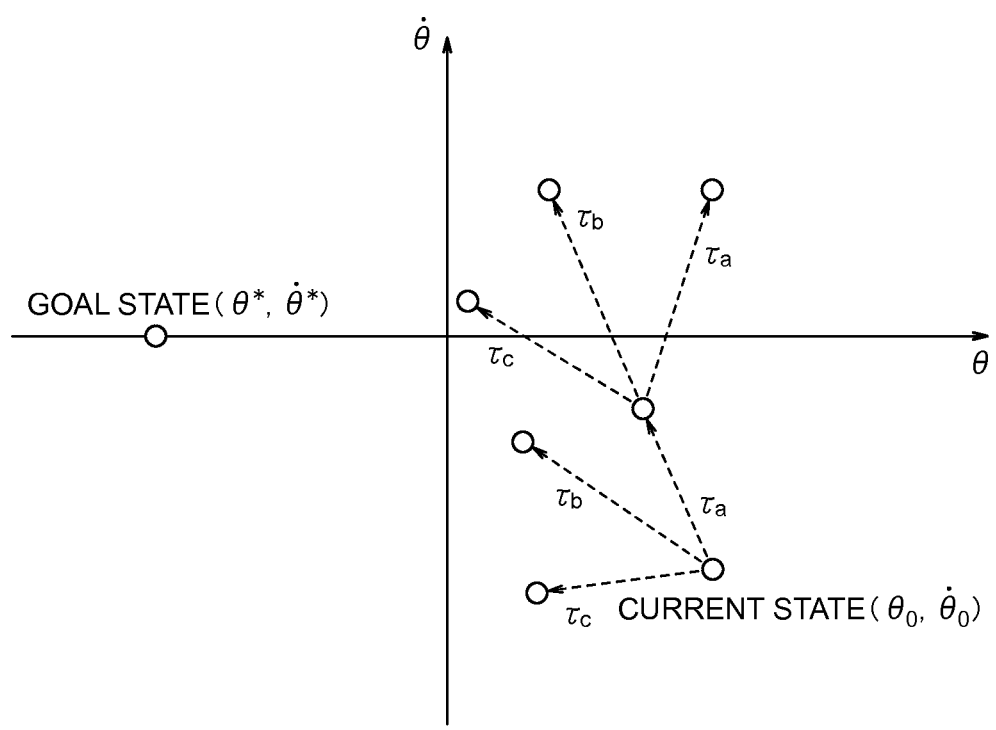
FIG. 5 illustrates steps S020 and S030 of FIG. 3.

FIG. 5 illustrates steps S020 and S030 of FIG. 3. In FIG. 5, the phase space is represented as a two-dimensional space for the sake of simplicity. Three different next states are determined by imposing three different torques $\tau_a$, $\tau_b$, $\tau_c$ on the double inverted pendulums 200 in the current state during the predetermined time period. The search tree generating section 101 registers these states as nodes of branches of the search tree. Further, when three different torques $\tau_a, \tau_b, \tau_c$ are imposed on the double inverted pendulums 200 in each state represented by a generated node of branch, another three different next states are determined.

In step S040 of FIG. 3, the search tree generating section 101 merges branches of the search tree. Assume that the number of branches derived from the root or a branch as described above is N and a depth of the tree is M when the search tree generating section 101 generates the search tree. Then the number of branches to be searched at a level of a depth of tree of M is $N^M$. The search tree generating section 101 merges generated branches using cells described above. More specifically, the search tree generating section 101 carries out the following operation in step S040 of FIG. 3.

The search tree generating section 101 determines to which cell in the phase space, each of the next states which have been derived belongs. Then, the search tree generating section 101 determines whether or not any state which belongs to the cell has already been registered as a node of a branch. If any state has not been registered, the process goes to step S045. If at least one state has already been registered, the process goes to step S060.

In step S045 of FIG. 3, the search tree generating section 101 determines whether or not the derived state meets physical constraints and environmental constraints. The physical constraints are, for example, those for angles set in such a way that the first and second links which correspond to physical members do not collide with each other. The environmental constraints are those for angles set in such a way that the first and second links which correspond to physical members do not collide with an external obstacle, for example. If the next state meets the physical constraints and environmental constraints, the process goes to step S050. If the next state does not meet any of the physical constraints and environmental constraints, the process goes to step S060.

In step S050 of FIG. 3, the search tree generating section 101 registers the derived state as a node of a branch.

In step S060 of FIG. 3, the search tree generating section 101 discards the next state corresponding to the node of the branch derived by the search tree generating section 101.

Figure 6:
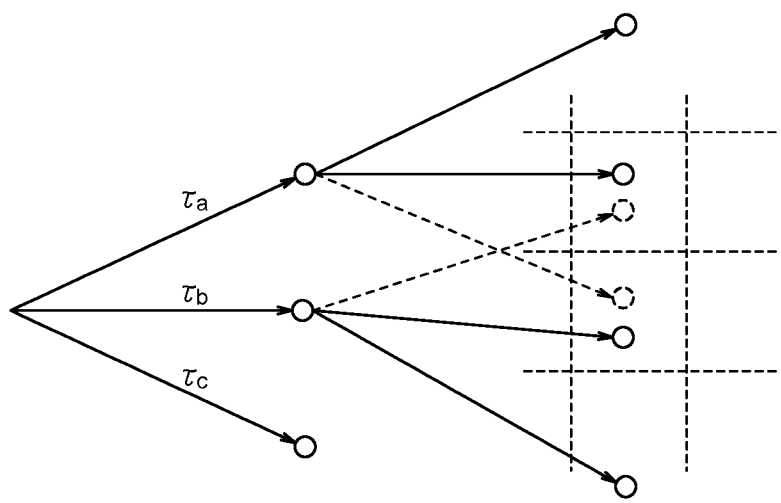
FIG. 6 illustrates operations of steps S050 and S060 of FIG. 3.

FIG. 6 illustrates operations of steps S050 and S060 of FIG. 3. Only one node of a branch can exist in one cell in principle. The search tree generating section 101 discards a new branch whose node exists in a cell in which a node of a branch (which is represented as a circle with a solid line in FIG. 6) already exists. That is, states which are dose to one another in the phase space are merged into a single state. Thus, calculation cost can be remarkably reduced by merging conventional branches of the search tree using cells.

In step S070 of FIG. 3, the search tree generating section 101 determines whether or not the search has been completed. The search tree generating section 101 may determine that the search has been completed when search up to a predetermined depth of the search tree has been completed or search for a predetermined time period has been completed. When the search is determined to have been completed, the process goes to step S080. When the search is not determined to have been completed, the process returns to step S030 and the search is continued.

In step S080 of FIG. 3, the trajectory generating section 107 selects the state which is at the closest range to the goal state in the phase space from the states represented by nodes of the branches and regards the selected state as the best state (in the case of optimizing the final state). Alternatively, the trajectory generating section 107 selects the state a distance of which in the phase space to the goal state is equal to or less than a predetermined value and a depth of which in the search tree is the smallest from the states represented by nodes of the branches and regards the selected state as the best state (in the case of optimizing access time). The trajectory generating section 107 obtains a trajectory from the current state (initial state) to the best state by obtaining a path along branches of the search tree from the current state to the best state. Thus, a trajectory planning is obtained. For example, a robot can optimize the final state of its arm or can optimize access time to the goal state by controlling its arm according to the trajectory planning thus obtained.

In the above-described embodiment, the search tree generating section 101 regards the current state as the root of the search tree to be generated. In another embodiment, the search tree generating section 101 can regard the goal state as the root of the search tree to be generated.

In the trajectory planning method according to the present invention described in the present text of specification, the object is represented as double inverted pendulums 200 to simplify the description. However, the idea of merging branches using cells can be applied to a trajectory planning method in a state space of any object.

Operation of the cell generating section 103 will be described below. The cell generating section 103 generates cells by dividing the state space (phase space) in such a way that approximation error due to discretization is minimized for a predetermined number of cells. Discretization means merging of states using cells.

At first, approximation error will be described. Merging of states in step S040 in FIG. 3 is based on the assumption that when the Euclidean distance $\rho(x_a, x_b)$ between points $x_a$ and $x_b$ in the phase space is sufficiently small, a distance $\rho(x_a', x_b')$ between points $x_a'$ and $x_b'$ to which points $x_a$ and $x_b$ respectively transfer after $\Delta t$ when input u is given is also small and therefore search from $x_a$ and search from $x_b$ will give similar state-transition sequences. The state after $\Delta t$ is represented by the following expression $$x' = x(t+\Delta t) = F(x(t), u(t)) \quad (1)$$

When a sequence obtained by search from a certain state (a point in the phase space) in a cell is approximated by a sequence obtained by search from the center $x_\mu$ of the cell, a distance between state $x(t+\Delta t)$ to which the certain state transfers after $\Delta t$ when input u is given and state $x_\mu(t+\Delta t)$ to which the center of the cell transfers after $\Delta t$ when the same input u is given can be used for a scale of approximation error of the cell. A scale of approximation error of the cell for input u(t) can be represented by an average of a distance between a state to which any state in the cell transfers and a state to which the center $x_\mu$ of the cell transfers, for the whole area within the cell $\chi_{cell}$. A scale of approximation error of the cell can be represented as an average of the above-described scale of approximation error of the cell for input u(t), for a set U of all possible inputs as below.

$$Error_{cell} = \frac{\int_U \int_{\chi_{cell}} \rho(F(x, u), F(x_\mu, u)) dx du}{\int_U \int_{\chi_{cell}} dx du} \quad (2)$$

Figure 7:
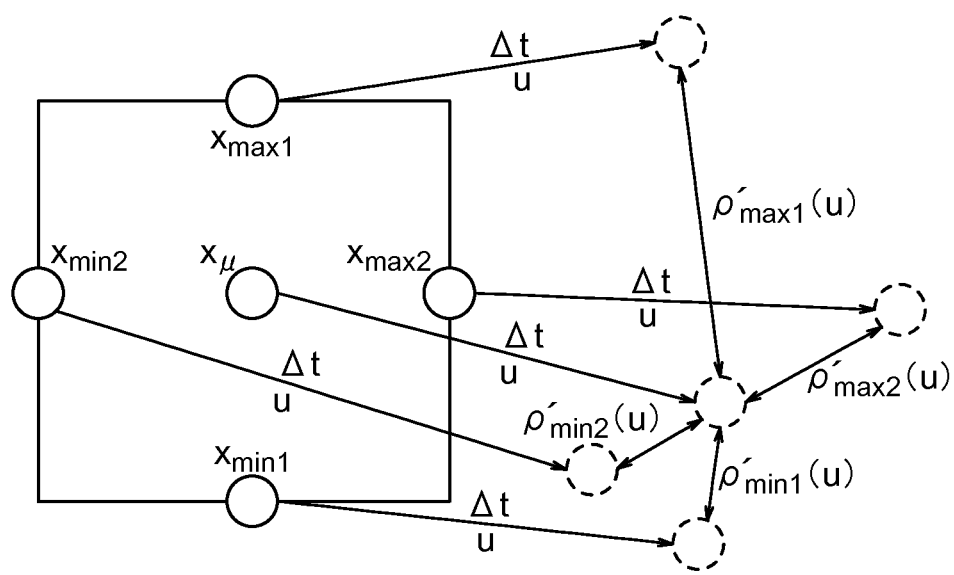
FIG. 7 illustrates how to calculate the approximation error of the cell.

FIG. 7 illustrates how to calculate the approximation error of the cell.

In order to calculate the approximation error by Expression (2), F(x, u) is calculated for typical points in the cell and then the average is obtained in the present embodiment. As shown in FIG. 7, a point with the maximum coordinate and a point with the minimum coordinate of each axis are selected as the typical points. The approximation error of the cell is calculated by the following expressions. N represents degree of freedom of the mechanical model. In the present embodiment, N is 2.

$$Error_{cell} \approx \frac{\sum_{u \in U} E_{cell}(u)}{|U|} \quad (3)$$

$$E_{cell} = \frac{1}{2N} \sum_{i=1}^{2N} \frac{\rho'_{mini}(u) + \rho'_{maxi}(u)}{2} \quad (4)$$

A method by which the cell generating section 103 generates cells by dividing the phase space using the approximation error of the cell obtained as described above will be described.

Figure 8:
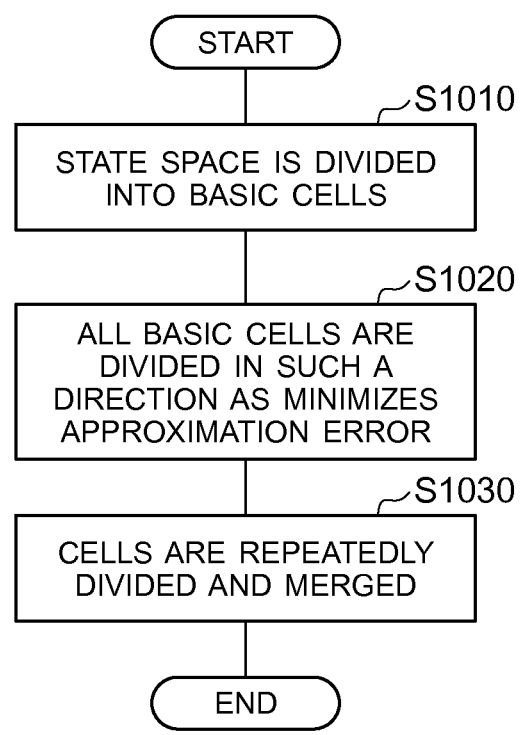
FIG. 8 is a flowchart showing how the cell generating section generate cells by dividing the phase space.

FIG. 8 is a flowchart showing how the cell generating section 103 generate cells by dividing the phase space.

In step S1010 of FIG. 8, the cell generating section 103 divides the phase space into basic cells having a uniform size. The number of the basic cells is set less than the final number of the cells. A length of the basic cells in each axis can be identical.

In step S1020 of FIG. 8, the cell generating section 103 divides all of the basic cells in such a direction as minimizes the approximation error of each cell.

Figure 9:
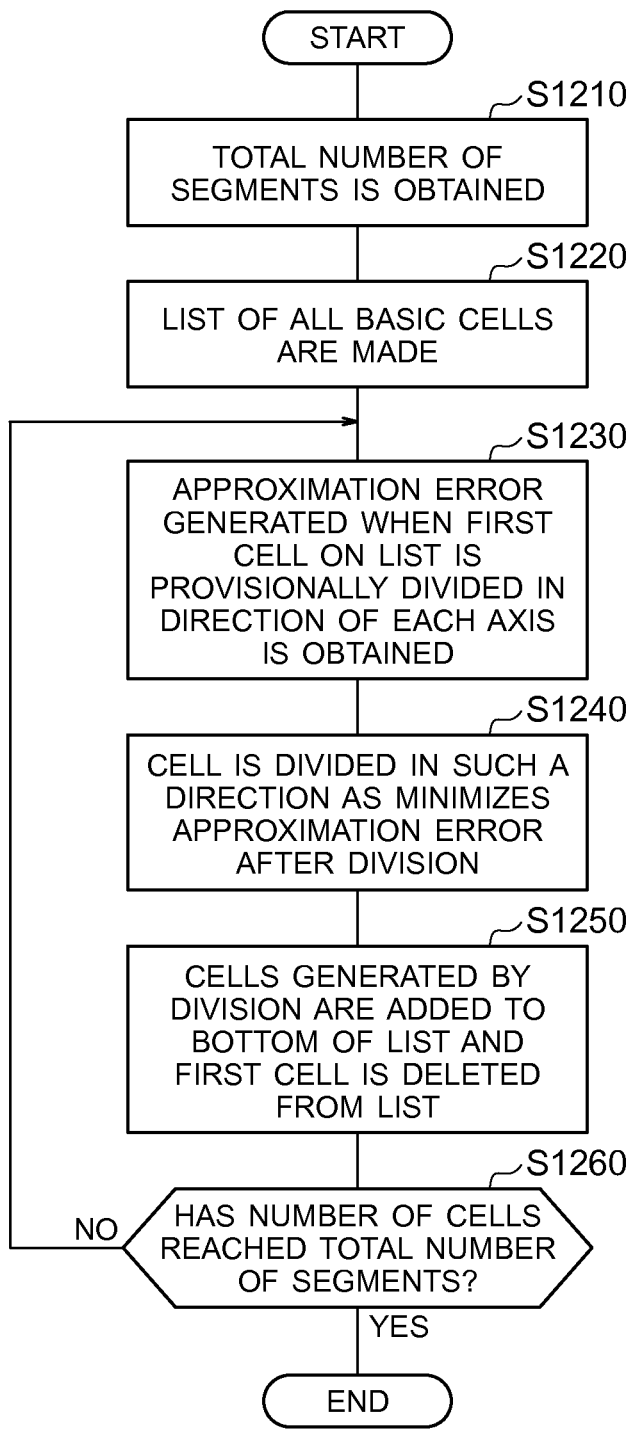
FIG. 9 is a flowchart for illustrating step S1020 of FIG. 8 in detail.

FIG. 9 is a flowchart for illustrating step S1020 of FIG. 8 in detail.

In step S1210 of FIG. 9, the cell generating section 103 obtains the total number of segments, that is, the final number of the cells.

In step S1220 of FIG. 9, the cell generating section 103 makes a list of all of the basic cells.

In step S1230 of FIG. 9, as to the first cell on the list, the cell generating section 103 obtains approximation errors of cells when the first cell is provisionally divided in the direction of each axis.

In step S1240 of FIG. 9, the cell generating section 103 divides the cell in such a direction of axis as minimizes the approximation errors after the division. When dividing cells, a structure of division based on binary tree is used as shown in Y. Tazaki and J. Imur. "Approximately Bisimilar Discrete Abstractions of Nonlinear Systems Using Variable-resolution Quantizers," American Control Conference, pp. 1015-1020, (2010). The structure of division is provided with a function of dividing a designated cell into child cells.

In step S1250 of FIG. 9, the cell generating section 103 adds the cells generated by the division to the bottom of the list and deletes the first cell from the list.

In step S1260 of FIG. 9, the cell generating section 103 determines whether the number of the cells has reached the final number. If the number of the cells has reached the final number, the process is completed. If the number of the cells has not reached the final number, the process returns to step S1230.

As described above, in step S1020 of FIG. 8, the basic cells are divided in such a way that the approximation error is minimized.

In step S1030 of FIG. 8, the cell generating section 103 repeatedly divides and merges cells.

Figure 10:
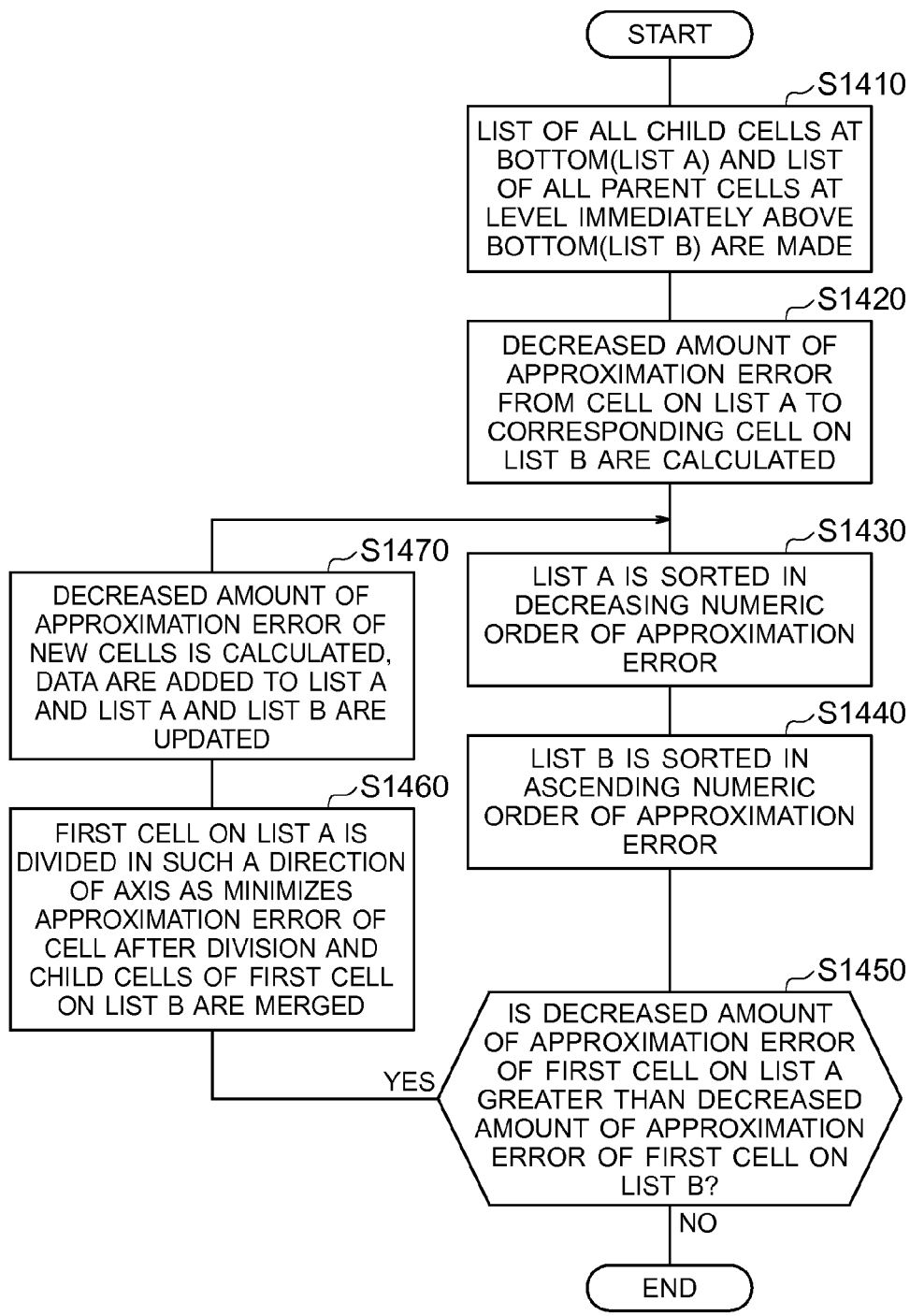
FIG. 10 is a flowchart for illustrating step S1030 of FIG. 8 in detail.

FIG. 10 is a flowchart for illustrating step S1030 of FIG. 8 in detail

In step S1410 of FIG. 10, the cell generating section 103 makes a list of all the child cells at the bottom of the structure of division (which is hereinafter referred to as list A) and a list of all the parent cells at the level immediately above the bottom (which is hereinafter referred to as list B).

In step S1420 of FIG. 10, the cell generating section 103 calculates a decreased amount of the approximation error of a cell in list A from the corresponding cell in list B. The decreased amount of the approximation error can be represented as the following equation.

$$\Delta \overline{Error}_{cell_i} = \overline{Error}_{cell} - (\overline{Error}_{sub1_i} + \overline{Error}_{sub2_i}) \quad (5)$$

The first term on the right side of the equation represents the approximation error of the parent cell, while the second and third terms on the right side of the equation represent the approximation errors of the child cells. Suffix "i" represents that the division is performed in the direction of axis i.

In step S1430 of FIG. 10, the cell generating section 103 sorts list A in decreasing numeric order of the approximation error.

In step S1440 of FIG. 10, the cell generating section 103 sorts list B in ascending numeric order of the approximation error.

In step S1450 of FIG. 10, the cell generating section 103 determines whether or not a decreased amount of the approximation error of the first cell on list A is greater than a decreased amount of the approximation error of the first cell on list B. If the decreased amount of the approximation error of the first cell on list A is greater than the decreased amount of the approximation error of the first cell on list B, the process goes to step S1460. Otherwise, the process is completed.

In step S1460 of FIG. 10, the cell generating section 103 divides the first cell on list A in such a direction of axis as minimizes the approximation error of the cell after the division and merges the child cells of the first cell on list B.

In step S1470 of FIG. 10, the cell generating section 103 calculates a decreased amounts of the approximation error of new cells, adds the data to list A and updates list A and list B.

As described above, in step S1030 of FIG. 8, the cell generating section 103 repeatedly divides and merges cells in such a way that an average of the approximation error is reduced. In step S1030, the total number of the cells remains unchanged.

In step S1020 of FIG. 8, the basic cells are divided in such a way that the approximation error of each basic cell is minimized. However, the number of segments derived from each basic cell is substantially equal and therefore non-uniform division is locally generated at this stage. Accordingly, in order to globally reduce averaged approximation error of basic cells, step S1030 of FIG. 8 in which cells are repeatedly divided and merged is performed. In step S1030, significance of a cell is represented by a volume of the cell $$V_{cell}$$

in the volume of the whole space.

$$V_{space}$$

Then, a way of division is adjusted in such a way that a sum of the approximation errors in the whole space which is weighted by the above-described significance is minimized. To be precise, in the process, the sum of the approximation errors converges on a local solution.

$$\text{minimize} \sum_{cell \in \chi} \frac{V_{cell}}{V_{space}} Error_{cell} \quad (6)$$

Simulation experiments of the double inverted pendulums 200, which were carried out to check effects of the trajectory planning system of the present embodiment will be described below. A length and a mass of the first link 205 of the double inverted pendulums 200 are h and $m_1$, respectively. The center of gravity 203 is positioned at the center of the link. A length and a mass of the second link 211 of the double inverted pendulums 200 are $l_2$ and $m_2$, respectively. The center of gravity 209 is positioned at the center of the link. Further, acceleration of gravity is represented as g.

Table 1 shows parameters of the double inverted pendulums 200.

TABLE 1

|  | Length [m] | Mass [kg] |
| --- | --- | --- |
| First link | 0.5 | 0.5 |
| Second link | 0.5 | 0.5 |

The equations of motion of the double inverted pendulums 200 are represented as below.

$$(\alpha+\gamma+2\beta \cos \theta_2)\ddot{\theta}_1+(\gamma+\beta \cos \theta_2)\ddot{\theta}_2-\beta(2\dot{\theta}_1+\dot{\theta}_2)\dot{\theta}_2 \sin \theta_2+k_1 \cos \theta_1+k_2 \cos(\theta_1+\theta_2)=\tau_1$$

$$(\gamma+2\beta \cos \theta_2)\ddot{\theta}_1+\gamma\ddot{\theta}_2+\gamma\ddot{\theta}_2+\beta\dot{\theta}_1^2 \sin \theta_2+k_2 \cos(\theta_1+\theta_2)=\tau_2$$

$$\alpha=I_1+\tfrac{1}{4}m_1l_1^2+m_2l_1^2$$

$$k_1=(\tfrac{1}{2}m_1l_1+m_2l_1)g$$

$$\beta=\tfrac{1}{2}l_1m_2l_2$$

$$k_2=\tfrac{1}{2}m_2l_2g$$

$$\gamma=I_2+\tfrac{1}{4}m_2l_2^2$$

The coordinates are changed as shown below in order to facilitate the understanding of a relationship between joint angle and gravity.

$$q_1 = \theta_1 - \frac{\pi}{2}$$

$$q_2 = \theta_2$$

Table 2 shows parameters of the trajectory planning system of the present embodiment.

TABLE 2

| Joint | Limit of position [rad] | Limit of velocity [rad/s] | Maximum torque [Nm] | Torque resolution |
| --- | --- | --- | --- | --- |
| 1 | No limit | $2\pi$ | 2.0 | 30 |
| 2 | No limit | $4\pi$ | 2.0 | 30 |

In the simulator, the increment of time $\Delta t$ is set to 50 milliseconds and the maximum time period of motion is set to 10 seconds. Assuming that cost of motion is time period of motion, quasi-minimum-time-period motion was obtained under various boundary conditions. Further, as a function representing distance, the following equation is defined.

$$\rho(x_a, x_b) = \sqrt{\sum_{i=1}^{N} \left(w_{p_i}^2 (q_{a_i} - q_{b_i})^2 + w_{v_i}^2 (\dot{q}_{a_i} - \dot{q}_{b_i})^2\right)} \quad (7)$$

$w_{pi}$ and $w_{vi}$ are weighting factors for respective axes. In the present simulation, for each joint $w_{pi}$ and $w_{vi}$ were set to 1.0 and 0.2, respectively.

In the present simulation, a first initial state in which both the first link 205 and the second link 211 are hanging and at rest and a second initial state in which both the first link 205 and the second link 211 are inverted and at rest are defined.

Figure 11:
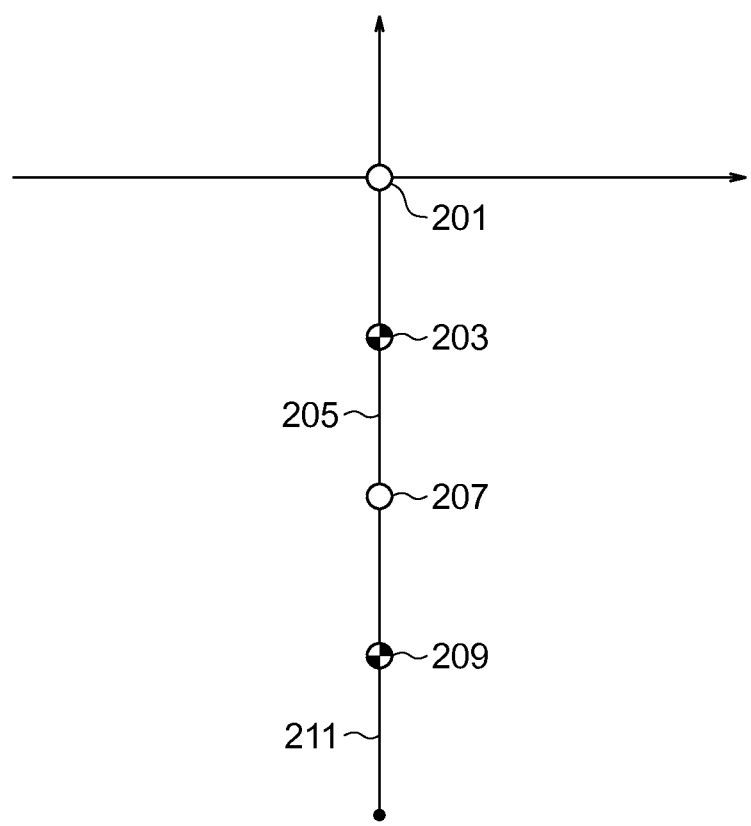
FIG. 11 shows the first initial state of the double inverted pendulums.

FIG. 11 shows the first initial state of the double inverted pendulums 200. Coordinates of the double inverted pendulums 200 in the first initial state are as below.

$$(q_1, \dot{q}_1) = (-\pi, 0)$$

$$(q_2, \dot{q}_2) = (0, 0)$$

Figure 12:
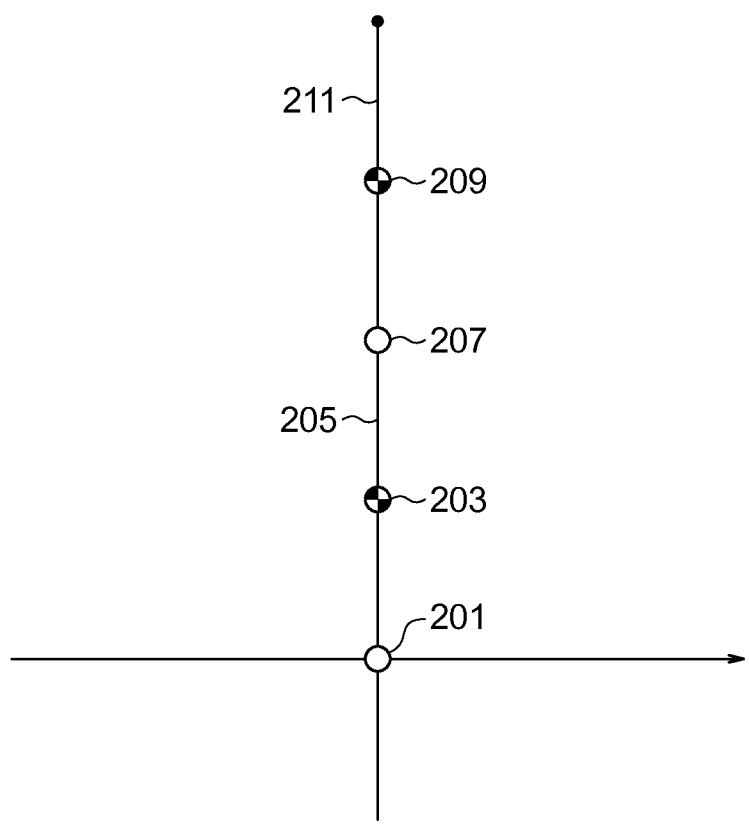
FIG. 12 shows the second initial state of the double inverted pendulums.

FIG. 12 shows the second initial state of the double inverted pendulums 200. Coordinates of the double inverted pendulums 200 in the second initial state are as below.

$$(q_1, \dot{q}_1) = (0, 0)$$

$$(q_2, \dot{q}_2) = (0, 0)$$

In the present simulation, motions from the first and second initial states to a goal state which is sampled at random were planned and costs of motions, that is time periods of motions were obtained. Sample data including 100000 goal states were prepared and averaged time periods to the goal states were compared to one another under various conditions of division.

Further, length of cells was uniformly fixed in the attitude space and cells were non-uniformly divided in the velocity directions alone in the manner described above. The reason is that obstacles are represented as constraints in the attitude space and an influence on setting of distance parameters should be reduced. As length in each axial direction of the basic cells, the same value is set.

Figures 13A, 13B:
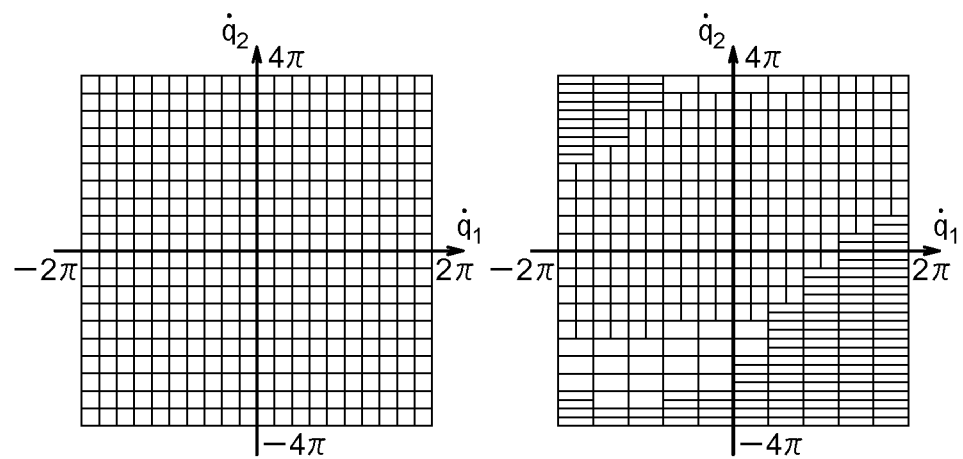
FIG. 13A and FIG. 13B show cross-sections of the velocity space in an attitude cell $$-\frac{\pi}{10} \le q_1 \le 0 \text{ and } \frac{9\pi}{10} \le q_2 \le \pi$$

FIG. 13A and FIG. 13B show cross-sections of the velocity space in an attitude cell $$-\frac{\pi}{10} \leq q_1 \leq 0 \text{ and } \frac{9\pi}{10} \leq q_2 \leq \pi$$

when the number of states (the final number of cells) is set to $20^4$. FIG. 13A shows the case in which division has been carried out while the same value is set as length of cells in each attitude direction and in each velocity direction. FIG. 13B shows the case in which length of cells is uniformly fixed in the attitude space and cells are non-uniformly divided in the velocity directions alone.

FIG. 14 shows a relationship between the number of cells and averaged time of motion obtained through simulation. In FIG. 14, the horizontal axis represents the number of cells (the total number of segments) while the vertical axis represents averaged time. In FIG. 14, "uniform cells" represents the case in which division has been carried out while the same value is set as length of cells in each attitude direction and in each velocity direction while "cells of present invention" represents the case in which length of cells is uniformly fixed in the attitude space and cells are non-uniformly divided in the velocity directions alone in the manner described above. It can be understood that as the number of states (the final number of cells) increases, the approximation error decreases and a shorter time period motion can be found. It can be estimated that as the number of states increases, time period of motion will converge on a certain value which is an average value of true minimum time period of motion. Further, it can be understood that under all conditions of division, with "cells of present invention" shorter time period motions can be found than with "uniform cells".

FIG. 15A to FIG. 15D show results of cases in which division has been carried out with uniform length of cells set in each axial direction in three different ways and a case in which length of cells is uniformly fixed in the attitude space and cells are non-uniformly divided in the velocity directions alone in the manner described above. FIG. 15A to FIG. 15D show the results of cases with the number of states (the final number of cells) of $16^4$, $20^4$, $24^4$ and $28^4$, respectively. In FIG. 15A to FIG. 15D, "uniform 1", "uniform 2" and "uniform 3" represent cases in which length of cells in $\dot{q}_1$ direction is made uniform, length of cells in $\dot{q}_2$ direction is made uniform and a ratio of length of cells in $\dot{q}_1$ direction to length of cells in $\dot{q}_2$ direction is set to 1:4, 1:1 and 4:1, respectively. Further, "present invention" represents a case in which length of cells is uniformly fixed in the attitude space and cells are non-uniformly divided in the velocity directions alone in the manner described above. In FIG. 15A to FIG. 15D, the horizontal as represents relative value of averaged time (cost). Relative value of averaged time (cost) is represented as a difference between averaged time in each case and averaged time in the case with the number of states of 304, which is regarded as the optimum value. A smaller value in the horizontal axis means a smaller relative value of averaged time (cost). Relative value of averaged time (cost) varies depending on the number of states. Assume that relative values of averaged time (cost) are divided into "uniform 1" group, "uniform 2" group and "uniform 3" group. There is no group, a relative value of averaged time (cost) of which is smaller than the relative values of averaged time (cost) of the two other groups for each of all the number of states. On the other hand, a relative value of averaged time (cost) of "present invention" is smaller than the relative values of averaged time (cost) of the other three groups for each of all the number of states.

Thus, by the trajectory planning system and trajectory planning method according to the present invention, a motion with a smaller cost than any motion under the same number of states can be found with a higher accuracy. Further, the trajectory planning and control system according to the present invention including the trajectory planning system according to the present invention can realize a motion with a smaller cost by realizing a trajectory generated by the trajectory planning system according to the present invention, using feedback control or the like. The essence of the present invention can be generally used for states of machines handled in the phase space, and therefore is applicable to a wide variety of fields, including of robots, automobiles, aircrafts, rockets and the like.

What is claimed is:

1. A trajectory planning method for determining a trajectory for controlling a state of a target device from an initial state toward a goal state, the method performed by a computer in a trajectory planning system, and the method comprising steps of:

dividing a state space of the device into cells;

generating, from a position in the state space indicative of the initial state to a cell containing a position indicative of the goal state, a search tree having at least one branch, each branch having a first node and a second node and each node indicating a respective state of the device, in such a way that each cell does not contain more than one node, the second node indicating the state after a state transition from a first state corresponding to the first node, the state transition occurring due to an input given to the device at the first state; and determining a path from the initial state to the goal state of the device by determining a set of the branches of the search trees connecting the initial state with the goal state, wherein, in the step of dividing the state space, an approximation error of each of the cells is calculated and the state space is divided into a predetermined number of cells such that a sum total of the approximation error over all the cells is minimized, and wherein the approximation error is defined as a size of distribution of a group of states in the state space after state transitions from a group of states within the corresponding cell, said state transition occurring due to applying a group of possible inputs to the group of states within a corresponding cell.

2. A trajectory planning method according to claim 1, wherein the approximation error is defined as a value obtained by calculating an averaged length in the state space between points indicative of the states after a state transition due to one of the possible input from the states within the corresponding cell and a reference point indicative of the state after the state transition from the state at center of the corresponding cell and by averaging the averaged lengths with respect to the group of possible inputs.

3. A trajectory planning method according to claim 1 or 2, wherein the step of dividing the state space comprises steps of a. dividing the state space into cells all having same dimensions, the number of the cells being less than the predetermined number;

b. dividing each of the cells, one after another, along one axis of the state space until the total number cells reaches the predetermined number, the one axis being selected so that a decrease of the approximation error due to dividing the each of the cells is minimized, the decrease being calculated by subtracting from the approximation error of the cell to be divided a total value of the approximation error over a set of cells formed by dividing the cell to be divided;

c. with respect to the sets of cells formed in the previously executed Step b or a previously executed step d, combining into one cell the set of cells which gives the minimum value of the decrease of the approximation error;

d. with respect to the sets of cells formed in the previously executed Step b or a previously executed step d, dividing one cell included in the set of cells which gives the maximum value of the decrease of the approximation error, along one axis of the state space so that the decrease of the approximation error of the one cell is minimized; and e. executing Steps c and d repeatedly until the decreases of the approximation error of all the sets of cells formed in the previously executed step b or d are substantially equal to each other.

4. A trajectory planning system for determining a trajectory for controlling a state of a target device from an initial state toward a goal state, the system comprising a computer, the computer configured to:

divide a state space of the device into cells;

generate, from a position in the state space indicative of the initial state to a cell containing a position indicative of the goal state, a search tree having at least one branch, each branch having a first node and a second node and each node indicating a respective state of the device, in such a way that each cell does not contain more than one node, the second node indicating the state after a state transition from a first state corresponding to the first node, the state transition occurring due to an input given to the device at the first state; and determine a path from the initial state to the goal state of the device by determining a set of the branches of the search trees connecting the initial state with the goal state, wherein the computer calculates an approximation error of each of the cells and divides the state space into a predetermined number of cells such that a sum total of the approximation error over all the cells is minimized, and wherein the approximation error is defined as a size of distribution of a group of states in the state space after state transitions from a group of states within the corresponding cell, said state transition occurring due to applying a group of possible inputs to the group of states within a corresponding cell.

5. A trajectory planning and control system comprising the trajectory planning system according to claim 4 and a trajectory controller for controlling the target device to change its state along the trajectory determined by the trajectory planning system.

* * * * *

UNITED STATES PATENT AND TRADEMARK OFFICE
CERTIFICATE OF CORRECTION

Page 1 of 1

PATENT NO.        : 8,825,207 B2
APPLICATION NO.   : 13/455436
DATED             : September 2, 2014
INVENTOR(S)       : Chyon Hae Kim et al.

It is certified that error appears in the above-identified patent and that said Letters Patent is hereby corrected as shown below:

On the title page

Add the second Assignee

(73) Assignee:   Honda Motor Co., Ltd., Tokyo, (JP)

and

Waseda University, Tokyo, (JP)

Signed and Sealed this
Fifth Day of January, 2016

Michelle K. Lee
*Director of the United States Patent and Trademark Office*